Patented June 19, 1951

2,557,353

UNITED STATES PATENT OFFICE 2,557,353

PHENYLSTIBONIC ACID SALTS OF ARECOLINE

Paul L. Kartsonis, Kansas City, Mo., and James A. Austin, Mission, Kans., assignors to Jensen-Salsbery Laboratories, Inc., Kansas City, Mo., a corporation of Missouri No Drawing. Application February 20, 1950, Serial No. 145,316

5 Claims. (Cl. 260—270)

This invention relates to new compounds which are effective tapicides and ascaricides, adapted for the treatment of dogs infested with tape worms and ascarids.

The new compounds of the invention are salts or coordinated complexes of phenyl and substituted phenyl stibonic acids with arecoline (N-methyltetrahydropyridine-carboxylic acid-methyl ester) and we believe they may be represented by the formula

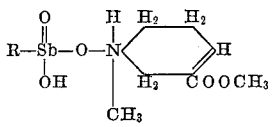

in which R is a phenyl or substituted phenyl radical.

It is known that arecoline is an effective tapicide, but when administered to dogs it frequently produces emesis, so that the drug is lost by vomiting and does not reach the intestinal tract.

The new compounds of the invention retain the effective tapicidal properties of arecoline, but have a very much decreased tendency to cause emesis, and are tolerated by dogs in dosages considerably greater than the effective dose required for the removal of tape worms. Thus, the new compounds may be administered at dosage levels, based on the arecoline, as great as four times the presently recommended dose of arecoline, and tolerance studies have shown that doses even three times as great as this are tolerated without emesis. It has also been observed that the new compounds of the invention are quite effective in removing ascarids or round worms from the intestinal tracts of dogs to which the compounds are administered.

The new compounds of the invention, that is, the salts or coordinated complexes of arecoline with the phenyl or substituted phenyl stibonic acids are readily prepared by reaction of the arecoline with the selected stibonic acid in water, with heating, followed by concentration and crystallization of the product. Their preparation will be illustrated by the following example.

Example 77.6 grams of arecoline in 300 cc. of water are warmed on a water bath, and 146.45 grams of p-carboxy phenyl stibonic acid are added with stirring. Additional water is added, if needed, to maintain complete solution. The heating and stirring is continued for 30 minutes. The solution is then filtered and concentrated to a syrup. This is allowed to crystallize in a desiccator. We believe the arecoline in this compound is coordinated through the nitrogen of the pyridine ring through oxygen to the antimony of the stibonic acid as represented by the following formula:

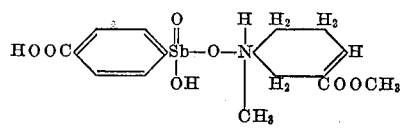

This compound, on administration to dogs at a dosage level of 4.69 mg. per pound of body weight, was found to be extremely effective in removing tape worms. This dosage level corresponds to four times the recommended dose of arecoline. We have determined that between 2.5 and 3 times greater dosage may be given without ill effects. Amounts larger than this tend to produce emesis. The toxic dose is probably considerably larger than this, but is difficult to determine because of vomiting.

We have also noted that this compound at the dosage level specified is effective in removing ascarids or round worms from dogs infested with them.

Salts or coordinated complexes of arecoline with other phenyl stibonic acids are readily prepared by the procedure outlined in the above example. The salt or coordinated complex of arecoline with benzene stibonic acid so prepared is very effective in removing tape worms from dogs. The salt or coordinated complex of p-toluene stibonic acid with arecoline is an effective tapicide, but not as effective as the salts or coordinated complexes of arecoline with p-carboxy phenyl stibonic acid and benzene stibonic acid. The salt or coordinated complex of arecoline with 3-nitro-4-methyl-phenyl stibonic acid is also highly effective as a tapicide.

We claim:

1. Compositions of the formula

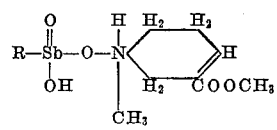

in which R is selected from the group consisting of the phenyl radical and phenyl radicals substituted by a radical selected from the class consisting of carboxy, lower alkyl and nitro radicals.

2. The salt of arecoline with benzene stibonic acid.
3. The salt of arecoline with p-carboxy phenyl stibonic acid.
4. The salt of arecoline with p-toluene stibonic acid.
5. The salt of arecoline with 3-nitro-4-methyl-phenyl stibonic acid.

PAUL L. KARTSONIS.
JAMES A. AUSTIN.

REFERENCES CITED

The following references are of record in the file of this patent:

FOREIGN PATENTS

| Number | Country | Date |
| --- | --- | --- |
| 145,062 | Switzerland | Apr. 16, 1931 |